March 13, 1934.　　K. C. D. HICKMAN ET AL　　1,950,890
NONHALATION FILM BACKING
Filed Aug. 1, 1931
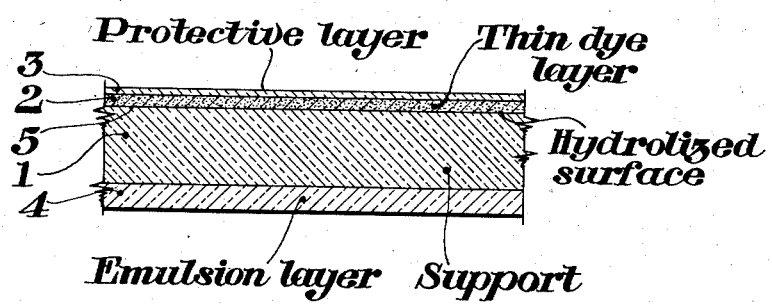
Kenneth C. D. Hickman
and Carleton R. Sanford,
Inventors
By Newton M. Perrins
Attorney.

Patented Mar. 13, 1934

1,950,890

UNITED STATES PATENT OFFICE 1,950,890

NONHALATION FILM BACKING

Kenneth C. D. Hickman and Carleton R. Sanford, Rochester, N. Y., assignors to Eastman Kodak Company, Rochester, N. Y., a corporation of New York Application August 1, 1931, Serial No. 554,462

12 Claims. (Cl. 95—9)

This invention relates to coatings and coating materials adapted for application to photographic films for the purpose of rendering them relatively free from halation.

Our invention relates to such a backing for a support of cellulosic derivative which backing will come away completely in water without some of the disadvantages inherent in many soluble or partially soluble backings.

Reference is made to the drawing the single figure of which is an enlarged cross-section of film embodying our invention.

In our invention the first stage is to prepare the film to receive the non-halation layer. This step consists in applying to a cellulose nitrate or cellulose acetate support the following solution:

Formula I

|  | Parts |
|---|---|
| Potassium hydroxide | 1 |
| Ethyl alcohol | 1000 |

This solution is applied at a temperature of about 50° C., although the temperature range may be between 30 and 80° C. This solution will be applied to one face of the support, on which it is desired to put a non-halation coating, by means of machines which are well known. In this formula the alkali may be replaced by other alkaline hydrolyzing agents such as sodium hydroxide or sodium sulphide, and the strength may be varied somewhat. The ethyl alcohol may be replaced by other organic solvents which do not substantially attack the film such as, for example, a mixture of methyl and butyl alcohols.

We have found that any tendency of the dye layer to flake off is obviated by this hydrolyzing pretreatment. This pretreatment is useful with dye coatings other than those specifically mentioned hereinafter.

The non-halation coating itself is now applied. This consists of the following solution:

Formula II

|  | Parts |
|---|---|
| Nigrosine (water soluble) | 4 |
| Gelatin (partially hydrolyzed) | 1 |
| Glycerine | 1/20 |
| Saponin | 1/100 |
| Water to | 100 |

This coating mixture is applied to the film on a drum heated to 70 to 75° C. In Formula II the quantity of nigrosine is, within reasonable limits, determined by the desired opacity of the coating. The gelatin may be varied from nothing to 2 parts and is present as a stabilizing agent and not as a vehicle or carrier in the ordinary sense. Its function is to keep the dye in an amorphous or microcrystalline state, and to prevent penetration into the base of later applied solvents. The glycerine is a hygroscopic agent and may be varied from zero to twice the quantity indicated. The saponin is added according to well established practice in quantities sufficient to give smooth coatings.

It is to be noted that in this formula the dye is in greater quantity than the gelatine, and as indicated, there will usually be at least twice as much dye as gelatin.

The next step consists in varnishing and waxing the film in one operation on a drum at 40 to 60° C. with a solution containing

Formula III

|  | Parts |
|---|---|
| Gum sandarac | 20 |
| Stearic acid | 5 |
| Ethyl acetate | 500 |
| Ethyl alcohol | 500 |

In Formula III the gum sandarac may be replaced by other substances such as gum mastic or shellac and the stearic acid may be replaced by another suitable waxy substance such as carnauba wax. The solvents may be any which will dissolve the materials without attacking the under coat or the base.

In Formula II other colloids than gelatin may be used. Examples are water soluble cellulose aceto-lactate as described in a pending application Serial No. 341,032 of C. J. Staud and C. S. Webber, filed February 18, 1929; cellulose aceto-phthalate made in accordance with the principles set forth in Patent No. 1,704,306 issued to R. L. Stinchfield March 5, 1929, or the U. S. Patent of H. T. Clarke and C. J. Malm No. 1,800,860 issued April 14, 1931; casein; or egg albumen. Of these the cellulose aceto-lactate and the egg albumen may be used with water alone as indicated in the formula. Cellulose aceto-phthalate and casein, however, will require the addition of a little ammonia, as they are soluble in dilute ammonia but not in water alone.

It is understood that any suitable dye or dye mixture may be used in Formula II. The dye chosen will however preferably be black or blue, although others may be useful. The hydrolyzing pretreatment is effective to prevent flaking with all of the dye coatings herein described.

The drawing shows the structure of a finished film made in accordance with our invention.

The film support 1 of cellulose nitrate, cellulose acetate, or any equivalent cellulosic ester or ether has coated on one side the emulsion layer 4. The opposite face 5 of the support represents the surface which has been treated with Formula I to remove water repellent substances and to prepare, by slight hydrolysis of the cellulose derivative, the surface to receive the non-halation coating Formula II. Over this surface is the thin dye layer 2 which represents the coating of Formula II which dries down to a very thin layer. On top of this is the protective layer 3 of gum and wax, which is even thinner than the dye layer.

It is to be noted of the dye coatings specifically given that the dye is removed in an alkaline solution, such as the usual developer, in the form of an insoluble compound that precipitates from the bath and does not flocculate in the developer. It does not stain the gelatine nor adhere to the film in tufts.

A number of changes may be made in the method outlined, and other modifications and equivalents than those mentioned may be employed, all of which we consider as within the scope of our invention as expressed in the appended claims.

What we claim is:

1. The method of making a non-halation photographic film which comprises coating a support of a cellulosic derivative with a water solution containing a dye and a colloid stabilizer for the dye, the colloid being soluble in photographic baths and present in a concentration insufficient to act as a carrier and the dye being in greater percentage by weight than the colloid.

2. The method of making a non-halation photographic film which comprises coating a support of a cellulosic derivative with a water solution containing gelatin and a water soluble dye, the gelatin being readily soluble and present in a concentration insufficient to act as a carrier and the dye being in greater percentage by weight than the gelatin.

3. The method of making a non-halation photographic film which comprises hydrolyzing one surface of a sheet of a cellulosic derivative and then coating said surface with a composition containing a dye and a stabilizing colloid, the colloid being present in lower percentage by weight than the dye.

4. The method of making a non-halation photographic film which comprises hydrolyzing one surface of a sheet of a cellulosic derivative and then coating said surface with a composition containing a dye and cellulose aceto-lactate, the cellulose aceto-lactate being present in lower percentage by weight than the dye.

5. The method of making a non-halation photographic film which comprises hydrolyzing one surface of a sheet of a cellulosic derivative and then coating said surface with a water solution containing gelatin and a water soluble dye, the gelatin being in a concentration insufficient to act as a carrier and the dye being in greater percentage by weight than the gelatin.

6. The method of making a non-halation photographic film which comprises treating a support of a cellulosic derivative with a weak solution of a strong alkali in an organic solvent and then coating said support with a water solution containing a dye and a colloid stabilizer for the dye, the colloid being in a concentration insufficient to act as a carrier and the dye being in greater percentage by weight than the colloid.

7. The method of making a non-halation photographic film which comprises treating a support of a cellulosic derivative with a weak solution of caustic alkali in alcohol and then coating said support with a water solution containing a dye and a colloid stabilizer for the dye, the colloid being in a concentration insufficient to act as a carrier and the dye being in greater percentage by weight than the colloid.

8. The method of making a non-halation photographic film which comprises treating a support of a cellulosic derivative with a weak solution of caustic alkali in alcohol, coating said support with a water solution containing gelatin and a water soluble dye, the gelatin being in a concentration insufficient to act as a carrier and the dye being in greater percentage by weight than the gelatin, and then overcoating the dye layer with a protective layer.

9. The method of making a non-halation photographic film which comprises treating a support of a cellulosic derivative with a weak solution of caustic alkali in alcohol, coating said support with a water solution containing gelatin and a water soluble dye, the gelatin being in a concentration insufficient to act as a carrier and the dye being in greater percentage by weight than the gelatin, and then overcoating the dye layer with a protective layer containing a gum and a wax.

10. A non-halation photographic film comprising a sheet of cellulosic derivative composition, a sensitive layer on one surface and on the other surface a non-halation layer comprising a dye and a stabilizing colloid, the colloid being soluble in photographic solutions and present in lower percentage by weight than the dye whereby the dye layer may be readily removed in the course of photographic operations.

11. A non-halation photographic film comprising a sheet of cellulosic derivative composition, a sensitive layer on one surface thereof and on the other surface a non-halation layer comprising a dye and gelatin, the gelatin being present in lower percentage by weight than the dye.

12. A non-halation photographic film comprising a sheet of cellulosic derivative composition, a sensitive layer on one surface thereof and on the other surface a non-halation layer comprising a dye and a water soluble cellulose derivative, the cellulose derivative being present in lower percentage by weight than the dye.

KENNETH C. D. HICKMAN.
CARLETON R. SANFORD.